(12) United States Patent
Dobashi et al.

(10) Patent No.: US 12,486,436 B2
(45) Date of Patent: Dec. 2, 2025

(54) HOT MELT COMPOSITION

(71) Applicant: Henkel AG & Co., KGaA, Dusseldorf (DE)

(72) Inventors: Masaaki Dobashi, Yokohama (JP); Takahide Morishita, Osaka (JP); Koji Shirai, Osaka (JP)

(73) Assignee: HENKEL AG & CO. KGaA, Duesseldorf (DE)

( * ) Notice: Subject to any disclaimer, the term of this patent is extended or adjusted under 35 U.S.C. 154(b) by 984 days.

(21) Appl. No.: 17/583,278

(22) Filed: Jan. 25, 2022

(65) Prior Publication Data

US 2022/0145142 A1 May 12, 2022

Related U.S. Application Data

(63) Continuation of application No. 16/158,810, filed on Oct. 12, 2018, now abandoned, which is a continuation of application No. PCT/JP2017/020734, filed on May 30, 2017.

(30) Foreign Application Priority Data

May 31, 2016 (JP) ................ 2016-108867

(51) Int. Cl.
| | |
|---|---|
| *C09J 11/06* | (2006.01) |
| *C09J 5/06* | (2006.01) |
| *C09J 9/00* | (2006.01) |
| *C09J 125/10* | (2006.01) |
| *C09J 153/02* | (2006.01) |
| *C09J 191/00* | (2006.01) |
| *F21S 45/50* | (2018.01) |
| *C08K 5/01* | (2006.01) |
| *F21S 8/00* | (2006.01) |
| *F21S 41/20* | (2018.01) |
| *F21S 41/29* | (2018.01) |
| *F21V 31/04* | (2006.01) |

(52) U.S. Cl.
CPC ............... *C09J 153/02* (2013.01); *C09J 5/06* (2013.01); *C09J 9/00* (2013.01); *C09J 11/06* (2013.01); *C09J 125/10* (2013.01); *C09J 153/025* (2013.01); *C09J 191/00* (2013.01); *F21S 45/50* (2018.01); *C08K 5/01* (2013.01); *C09J 2301/408* (2020.08); *C09J 2301/414* (2020.08); *F21S 8/00* (2013.01); *F21S 41/28* (2018.01); *F21S 41/29* (2018.01); *F21V 31/04* (2013.01)

(58) Field of Classification Search
CPC ... C09J 191/00; C09J 5/06; C09J 11/06; C09J 125/10; C09L 2301/414; C09L 2301/408; C09L 153/02; C09L 153/025
USPC ........................................... 524/505
See application file for complete search history.

(56) References Cited

U.S. PATENT DOCUMENTS

| | | |
|---|---|---|
| 6,482,281 B1 | 11/2002 | Schmidt |
| 2008/0306214 A1 | 12/2008 | Kanderski |

FOREIGN PATENT DOCUMENTS

| | | |
|---|---|---|
| EP | 0776940 A2 | 6/1997 |
| EP | 1101796 A1 | 5/2001 |
| JP | 106138671 A | 5/1994 |
| JP | H09217001 A | 8/1997 |
| JP | 3029102 B1 | 4/2000 |
| JP | 2001280507 A | 10/2001 |
| JP | 200238116 A | 2/2002 |
| JP | 2002228344 A | 8/2002 |
| JP | 200731572 A | 2/2007 |
| JP | 2008127473 A | 6/2008 |
| JP | 2008297441 A | 12/2008 |
| JP | 200988310 A | 4/2009 |
| JP | 2010254809 A | 11/2010 |
| JP | 2011080021 A | 4/2011 |
| JP | 2011162747 A | 8/2011 |
| JP | 2011190287 A | 9/2011 |
| JP | 2011195711 A | 10/2011 |
| JP | 2012017392 A | 1/2012 |
| JP | 2013104046 A | 5/2013 |
| JP | 2017179061 A | 10/2017 |
| JP | 2017186527 A | 10/2017 |
| WO | 2012133273 A1 | 10/2012 |
| WO | 2016170796 A1 | 10/2016 |

*Primary Examiner* — Ruiyun Zhang
(74) *Attorney, Agent, or Firm* — Sun Hee Thomas

(57) ABSTRACT

An objective of the present invention is to provide a hot melt composition having a high form maintaining property at a high temperature and being in excellent adhesion to a substrate and in disassembly. The present invention relates to a hot melt composition comprising: (A1) a styrene-ethylene-ethylene/propylene-styrene block copolymer (SEEPS) and (B1) a hydrocarbon-based oil having an aniline point of 135° C. or more.

16 Claims, No Drawings

HOT MELT COMPOSITION

TECHNICAL FIELD OF THE INVENTION

The present invention relates to a hot melt composition, particularly to the hot melt composition which can prevent deformation of the adhesive at a high temperature and can be easily removed when a lighting appliance is disassembled.

BACKGROUND OF THE INVENTION

A hot melt adhesive is used as a sealant for an automotive lighting appliance. The hot melt adhesive is required to have high sealing property to the automotive lighting appliance and to be removable from the lighting appliance in consideration of disassembly when the lighting appliance is repaired.

Conventionally, although moisture-curable hot melt adhesives have been used as sealing agents for a lighting appliance, it has been difficult to disassemble a lens and a housing part of the lighting appliance using these moisture-curable hot melt adhesives and thus they have not been suitable for recent LED type lighting appliance that requires internal repairs. Thus, a hot melt adhesive containing a styrene-based block copolymer has been used as a sealing agent for a lighting appliance in some cases.

Patent Literature 1 discloses a hot melt adhesive composition containing a styrene-ethylene-ethylene/propylene-styrene block copolymer (SEEPS) and a styrene-ethylene/propylene-styrene block copolymer (SEPS) as thermoplastic block copolymers. Patent Literature 2 discloses a hot melt composition comprising a styrene-ethylene-ethylene/propylene-styrene block copolymer (SEEPS) and a styrene-ethylene/butylene-styrene block copolymer (SEBS).

CITATION LIST

Patent Literature

Patent Literature 1: Japanese Patent Laid-Open No. 2011-190287

Patent Literature 2: Japanese Patent Laid-Open No. 2008-127473

SUMMARY OF THE INVENTION

Technical Problem

However, the hot melt adhesive composition described in Patent Literature 1 can not completely prevent deformation of the adhesive at a high temperature. The hot melt composition described in Patent Literature 2 has low disassembly property after aging test and failed to completely prevent deformation of the adhesive at a high temperature.

Therefore, it has been urgent to develop a hot melt adhesive which can be removed from a lighting appliance and is less deformed even at a high temperature. Particularly in recent years, in consideration of long-term use of the lighting appliance, a hot melt adhesive having small increase in adhesive strength with time and being easy to be removed from a lighting appliance, even if used for a long time, has been strongly desired.

Solution to Problem

As a result of extensive studies to solve the above problems, the present inventors have found that a hot melt composition comprising a specific thermoplastic block copolymer and a hydrocarbon-based liquid softening agent having an aniline point of a high temperature is hard to deform at a high temperature, has sufficient adhesive strength to a lighting appliance or the like, and is easy to be removed, and thus they have completed the present invention.

The present invention and preferred embodiment of the present invention is as follows.

1. A hot melt composition comprising:
    (A1) a styrene-ethylene-ethylene/propylene-styrene block copolymer (SEEPS) and
    (B1) a hydrocarbon-based oil having an aniline point of 135° C. or more.
2. The hot melt composition according to the above item 1, further comprising (A2) a styrene-ethylene/propylene block copolymer (SEP).
3. The hot melt composition according to the above item 2, wherein a content of the styrene-ethylene/propylene block copolymer (SEP) (A2) based on 100 parts by weight of the styrene-ethylene-ethylene/propylene-styrene block copolymer (SEEPS) (A1) is 5 to 100 parts by weight.
4. The hot melt composition according to any one of the above items 1 to 3, further comprising (C) a tackifier resin.
5. The hot melt composition according to the above item 4, the tackifier resin (C) comprises (C1) a tackifier resin having a softening point of 120° C. or more.
6. The hot melt composition according to any one of the above items 1 to 5, further comprising a carbonate component.
7. The hot melt composition according to any one of the above items 1 to 6, further comprising an acrylic component.
8. A lighting appliance in which a lens part and a housing part are joined with the hot melt composition according to any one of the above items 1 to 7.
9. A vehicle comprising the lighting appliance according to the above item 8.

Advantageous Effects of Invention

In the hot melt composition of the present invention, deformation hardly occurs and form maintaining property is high at a high temperature, and adhesion to a substrate is excellent. Moreover, it is possible to disassemble the lighting appliance and the like using the hot melt composition of the present invention.

In the present specification, "form maintaining property" is defined as difficulty to deform a hot melt composition at a high temperature. That is, the hot melt composition with less deformation at a high temperature is more excellent in form maintaining property.

DETAILED DESCRIPTION OF THE INVENTION

Description of Embodiments

The present invention relates to a hot melt composition comprising (A) a thermoplastic block copolymer which is a copolymer of a vinyl-based aromatic hydrocarbon and a conjugated diene compound and (B) a hydrocarbon-based liquid softening agent. In the hot melt composition of the present invention, the thermoplastic block copolymer (A) which is a copolymer of a vinyl-based aromatic hydrocarbon and a conjugated diene compound comprises (A1) a styreneethylene-ethylene/propylene-styrene block copolymer (SEEPS), and the hydrocarbon-based liquid softening agent (B) comprises (B1) a hydrocarbon-based oil having an aniline point of 135° C. or more. Each component will be explained below.

<(A) Thermoplastic Block Copolymer which is a Copolymer of a Vinyl-Based Aromatic Hydrocarbon and a Conjugated Diene Compound>

The thermoplastic block copolymer (A) which is a copolymer of a vinyl-based aromatic hydrocarbon and a conjugated diene compound (hereinafter, simply described as "a thermoplastic block copolymer (A)" or "component (A)") is a copolymer obtained by block copolmerization of a vinyl-based aromatic hydrocarbon and a conjugated diene compound (including copolymers in which the copolymers are further copolymerized). The "thermoplastic block copolymer (A)" may be a block copolymer having a vinyl-based aromatic hydrocarbon block and a conjugated diene compound block (non-hydrogenated block copolymer), or a hydrogenated block copolymer in which the block copolymers are hydrogenated. The thermoplastic block copolymer (A) may be used alone or in combination of two or more.

Here, the "vinyl-based aromatic hydrocarbon" means an aromatic hydrocarbon compound having a vinyl group, and specific examples thereof include styrene, o-methylstyrene, p-methylstyrene, p-tert-butylstyrene, 1,3-dimethylstyrene, α-methylstyrene, vinylnaphthalene and vinylanthracene. Particularly, styrene is preferred. These vinyl-based aromatic hydrocarbons may be used alone or in combination of two or more.

The "conjugated diene compound" means a diolefin compound having at least a pair of conjugated double bonds. Specific examples of the "conjugated diene compound" include 1,3-butadiene, 2-methyl-1,3-butadiene (or isoprene), 2,3-dimethyl-1,3-butadiene, 1,3-pentadiene and 1,3-hexadiene. 1,3-butadiene and 2-methyl-1,3-butadiene are particularly preferred. These conjugated diene compounds may be used alone or in combination of two of more.

As the "non-hydrogenated block copolymer", specific examples include those in which blocks based on the conjugated diene compounds are not hydrogenated. As the "hydrogenated block copolymer", specific examples include block copolymers in which all or a part of the blocks based on the conjugated diene compounds are hydrogenated.

The hydrogenated ratio of the "hydrogenated block copolymer" is represented by the "hydrogenation ratio". "Hydrogenation ratio" of the "hydrogenated block copolymer" refers to a ratio of double bonds converted to saturated hydrocarbon bonds by hydrogenation based on the total aliphatic double bonds contained in the blocks based on the conjugated diene compounds. The "hydrogenation ratio" may be measured by an infrared spectrophotometer, a nuclear magnetic resonance device and the like. The hydrogenation ratio of the styrene-ethylene-ethylene/propylene-styrene block copolymer (SEEPS) is preferably 80% or more, and more preferably 90% or more.

The weight average molecular weight (Mw) of the thermoplastic block copolymer (A) is not particularly limited, but it is preferably from 50,000 to 500,000, and more preferably 150,000 to 400,000. When the weight average molecular weight of the thermoplastic block copolymer (A) is within the above range, it is excellent in form maintaining property, shear adhesive strength and disassembly property. In the present specification, the weight average molecular weight and the number average molecular weight are measured by gel permeation chromatography (GPC) using a calibration curve using monodisperse molecular weight polystyrene as a standard substance to convert molecular weight.

A styrene content of the thermoplastic block copolymer (A) is not particularly limited, but it is preferably 5 to 50 wt %, and more preferably 10 to 40 wt %. The styrene content refers to the ratio of styrene block contained in the thermoplastic block copolymer (A). When the styrene content of the thermoplastic block copolymer is within the above range, the hot melt composition is excellent in heat resistance.

In the hot melt composition of the present invention, the thermoplastic block copolymer (A) comprises "(A1) a styrene-ethylene-ethylene/propylene-styrene block copolymer (SEEPS)", which is a hydrogenated block copolymer. The styrene-ethylene-ethylene/propylene-styrene block copolymer (SEEPS) (A1) is a hydrogenated product of a block copolymer composed of a styrene-butadiene-isoprene-styrene.

The SEEPS (A1) is swollen with a liquid softening agent such as process oil, imparts rubber elasticity to the hot melt composition, and can exhibit high heat-resistance, adhesion and strength as a sealing agent. During application of the hot melt composition, SEEPS exhibits fluidity as a thermoplastic resin by heating. Examples of commercial products of SEEPS include SEPTON 4033, SEPTON 4044, SEPTON 4055, SEPTON 4077 and SEPTON 4099 manufactured by Kuraray Co., Ltd.

In the hot melt composition of the present invention, the thermoplastic block copolymer (A) preferably comprises, in addition to the SEEPS (A1), "(A2) a styrene-ethylene/propylene block copolymer (SEP)" which is another hydrogenated block copolymer.

The styrene-ethylene/propylene block copolymer (SEP) (A2) is a hydrogenated product of a block copolymer composed of styrene-isoprene. Since SEP is an A-B type hydrogenated block copolymer, the styrene block is present only at one terminal end and the conjugated diene compound is present at the other terminal end. The presence of the conjugated diene compound at the terminal end improves compatibility with a paraffinic process oil and makes it possible to impart a tack to the hot melt composition.

In the styrene-ethylene/propylene block copolymer (SEP) (A2), a styrene block, which is a block part of an aromatic vinyl compound, can adhere tightly to PC (polycarbonate), and an ethylene/propylene block, which is a block part of conjugated diene compounds, can adhere tightly to PP (polypropylene). Therefore, the SEP (A2) can contribute particularly to the stabilization of the adhesion strength between two plastic adherends having different polarities. Examples of the commercial products of SEP include KRATON G1701, G1702HU manufactured by KRATON corporation and SEPTON 1001, SEPTON 1020 and the like manufactured by Kuraray Co., Ltd.

In the present invention, the content of the SEEPS (A1) to the total amount of 100 parts by weight of the thermoplastic block copolymer (A) is preferably 20 parts by weight or more, more preferably 30 parts by weight or more, further preferably 50 parts by weight or more, still further preferably 60 parts by weight or more and may be 100 parts by weight. The content of the component (A1) in the total amount of the hot melt composition is preferably about 3 to 20 wt %.

When the thermoplastic block copolymer (A) comprises (A1) a styrene-ethylene-ethylene/propylene-styrene block copolymer (SEEPS) and (A2) a styrene-ethylene/propylene block copolymer (SEP), the blending amount of SEP (A2) is preferably 5 to 100 parts by weight, more preferably 10 to 80 parts by weight, further preferably 30 to 70 parts by weight, based on 100 parts by weight of the SEEPS (A1). When the blending amount of the styrene-ethylene/propylene block copolymer (SEP) (A2) is within the above range, the hot melt composition is hard to deform at a high temperature, excellent in adhesion to the lighting appliance, and easy to be removed, furthermore, fogging resistance is improved and the lens can be prevented from being fogged.

In the present invention, the thermoplastic block copolymer (A) may contain other block copolymers (A3) within a range not adversely affecting the present invention. Examples of other block copolymers (A3) include hydrogenated block copolymers other than (A1) SEEPS and (A2) SEP and non-hydrogenated block copolymers. Examples of the hydrogenated product of the thermoplastic block copolymer include a styrene-ethylene/propylene-styrene block copolymer (also referred to as "SEPS") in which a styrene-isoprene-styrene block copolymer is hydrogenated, a styrene-ethylene/butylene-styrene copolymer (also referred to as "SEBS") in which a styrene-butadiene-styrene block copolymer is hydrogenated. Examples of the non-hydrogenated block copolymer include styrene-isoprene-styrene block copolymer (also referred to as "SIS") and styrene-butadiene-styrene block copolymer (also referred to as "SBS").

The content of the thermoplastic block copolymer (A) based on the total amount of the hot melt composition is preferably 3 wt % or more, more preferably from 4 wt % to 20 wt %, and further preferably from 4 wt % to 10 wt %. When the content of the thermoplastic block copolymer (A) is 3 wt % or more, the hot melt composition is excellent in heat resistance, adhesion and strength. When the content is 20 wt % or less, the shear adhesive strength of the hot melt composition does not become excessively high and disassembly is easy.

<(B) Hydrocarbon-Based Liquid Softening Agent>

(B) a hydrocarbon-based liquid softening agent (also referred to simply as "component (B)") is blended for the purpose of adjusting the melt viscosity of the hot melt composition, imparting flexibility and improving wettability to the adherend. The hydrocarbon-based liquid softening agent is mainly composed of carbon and hydrogen, and is in a liquid state at a room temperature (about 20° C.). The hydrocarbon-based liquid softening agent may have hetero atoms such as an oxygen atom, a nitrogen atom and a sulfur atom. Examples of the hydrocarbon-based liquid softening agent include paraffinic, naphthenic or aromatic-based process oil, liquid resins such as liquid polybutene, liquid polybutadiene and liquid polyisoprene, liquid paraffin and olefin process oil. Examples of commercial products of the process oil include Diana Process Oil manufactured by Idemitsu Kosan Co., Ltd.

In the present invention, the hydrocarbon-based liquid softening agent (B) comprises "(B1) a hydrocarbon-based oil having an aniline point of 135° C. or more" (also simply referred to as "component (B1)"). Since the aniline point of the component (B1) is higher than aniline points of the oils generally used in ordinary hot melt compositions, the melt viscosity of the hot melt composition is increased. As a result, the hot melt composition of the present invention can maintain its form at a high temperature, deformation is suppressed, and excellent form maintaining property can be achieved. The upper limit of the aniline point of the hydrocarbon-based oil of component (B1) is not particularly limited, but it is preferably 170° C. or less.

In the present specification, the aniline point is defined as the lowest temperature at which equal volumes of aniline and a sample are uniformly present as a solution thereof, which is determined by a test method such as a test tube method, a U-tube method, a thin film method, as described in JIS 2256, K 2520. The temperature is increased while the mixture of aniline and the sample are stirred to form a uniform and transparent solution. Subsequently, from the state of uniform and transparent solution, the temperature is lowered and then, the temperature at which turbidity begins is measured. The aniline point is related to the rubber swellability of lubricating oil and process oil. The lower the aniline point of an oil is, the higher the solubility of the oil is.

Since the hydrocarbon-based oil of the component (B1) of the present invention has a high aniline point of 135° C. or more and a high molecular weight, it's volatility is low and affinity with a midblock part of the thermoplastic block copolymer (a block part based on a conjugated diene compound) is high.

When the lighting appliance sealed with a conventional hot melt adhesive is used for a long time, there has been a problem that an adhesion strength has become high due to volatilization of the oil in the composition and the like and thus disassembly property deteriorates. On the other hand, in the hot melt composition of the present invention, since the component (B1) continues to permeate into the midblock part of the thermoplastic block copolymer (A), the adhesive strength of the hot melt composition does not continue to increase with time and thus stable disassembly property can be maintained even when used for a long time.

In the hot melt composition of the present invention comprising the thermoplastic block copolymer (A) and the oil (B1) having an aniline point of 135° C. or more, since the component (B1) has a high molecular weight, the viscosity of the hot melt composition can be increased and form maintaining property can be enhanced.

As described above, since the hot melt composition of the present invention comprises the hydrocarbon-based oil (B1) having an aniline point of 135° C. or more, it is particularly suitable for sealing materials for a lighting appliance of an automobile and the like and it is excellent in disassembly property when the lighting appliance is repaired. Further, it is possible to achieve long-term stable physical properties, and to achieve both of coating property and high form maintaining property. Thus, excellent performance can be exhibited.

Examples of the hydrocarbon-based oil (B1) having an aniline point of 135° C. or more include a process oil such as a paraffin oil derived from a paraffinic crude oil, an aromatic oil and a naphthene oil derived from a naphthenic crude oil, which have aniline points of 135° C. or more. Commercial products thereof include Diana Process Oil PW-380. As the component (B1), one type may be used alone or two or more types may be used in combination.

The hydrocarbon-based liquid softening agent (B) may comprise (B2) other hydrocarbon-based liquid softening agents (also referred to as "component (B2)") in addition to the hydrocarbon-based oil (B1) having an aniline point of 135° C. or more.

In the hot melt composition of the present invention, the content of the component (B1) based on 100 parts by weight of the component (B) is preferably 30 parts by weight or more, more preferably 50 parts by weight or more, further preferably 60 parts by weight or more, and may be 100 parts by weight. The content of the component (B1) in the total amount of the hot melt composition is preferably about from 10 wt % to 70 wt %.

The aniline point of other hydrocarbon-based liquid softening agents (B2) is preferably less than 135° C., more preferably 130° C. or less, and the lower limit is not particularly limited but is preferably 100° C. or more. Further, component (B2) is preferably a hydrocarbon-based oil.

In one embodiment of the present invention, it is preferable that the hot melt composition comprises both of the component (B1) and the component (B2) because the composition having a relatively low viscosity and high coating property can be obtained.

The content of the hydrocarbon-based liquid softening agent (B) in the total amount of the hot melt composition is preferably 30 wt % or more, more preferably 40 to 80 wt %, and further preferably 40 to 70 wt %. When the content of the component (B) is 30 wt % or more, the hot melt composition is excellent in form maintaining property at a high temperature and disassembly property is excellent even after long-term use. When the content is 80 wt % or less, suitable form maintaining property of the hot melt composition can be obtained.

<(C) Tackifier Resin>

One embodiment of the hot melt composition of the present invention preferably further comprises (C) a tackifier resin (also referred to as "component (C)"). Component (C) preferably comprises "(C1) a tackifier resin having a softening point of 120° C. or more". Here, in the present specification, the softening point is a value measured by an automatic softening point apparatus (ring and ball type) according to the petroleum asphalt test based on JIS K 2207. When the softening point of the tackifier resin is within the above range, the fluidity of the polymer composition of the present invention is stabilized.

The content of the tackifier resin (C1) having a softening point of 120° C. or more based on 100 parts by weight of the component (C) is preferably 50 parts by weight or more, more preferably 80 parts by weight or more, and may be 100 parts by weight. When the hot melt composition of the present invention comprises the tackifier resin (C1) having a softening point of 120° C. or more, higher form maintaining property can be kept.

The tackifier resin is not particularly limited, but examples thereof include a rosin resin, a terpene resin, a terpene phenol resin, an aromatic hydrocarbon modified terpene resin, a petroleum resin, a phenolic resin, an acrylic resin, a styrene-acrylic copolymer resin. From the viewpoint of adhesion, it is preferable that styrene-based tackifier resin is basically used with aromatic hydrocarbon-based terpene resin. Examples of commercial product thereof include Easttack series and Endex series manufactured by Eastman Corporation.

The tackifier resin (C) may be used alone or in combination of two or more.

The content of the tackifyier resin (C) based on the total amount of the hot melt composition may be 0 wt %, but it is preferably 20 wt % or more, more preferably 30 to 50 wt %, further preferably 30 to 40 wt %. When the content of the component (C) is 20 wt % or more, the adhesive strength of the hot melt composition is increased. When the content is 50 wt % or less, excellent disassembly property of the hot melt composition can be easily obtained.

<Polycarbonate Component>

One embodiment of the hot melt composition of the present invention preferably further comprises a polycarbonate component. In the case where the adherend is a polycarbonate substrate, adhesiveness to the lens part of the lighting appliance is enhanced by chemical affinity between the polycarbonate component and the adherend. That is, when the hot melt composition comprises the polycarbonate component, high adhesion to the polycarbonate can be obtained. In the case of using the hot melt composition in the lighting appliance, when adhesion to a polycarbonate substrate is high, the hot melt composition can be remained on the lens (polycarbonate) side when the light appliance is disassembled.

The polycarbonate component may be any polymer containing a polycarbonate structure. The polycarbonate component may have a terminal OH group, and may be a polycarbonate diol having OH groups at both terminals. From the viewpoint of compatibility with the hot melt composition, a polycarbonate diol is preferred.

The number average molecular weight (Mn) of the polycarbonate component is not particularly limited, but is preferably from 300 to 50,000, more preferably from 500 to 40,000, further preferably from 1,000 to 35,000.

When a polycarbonate diol having a relatively small molecular weight (for example, Mn is 5000 or less) as a liquid component is used, the wettability to the polycarbonate (PC) is improved and a higher adhesion effect can be obtained at the interface with the polycarbonate substrate. Examples of commercially available products of the polycarbonate component include DURANOL T4672, T5650J and T5652 manufactured by Asahi Kasei Chemicals Corporation, NIPPOLAN 982R manufactured by Nippon Polyurethane Industry Co., Ltd. and recycling PC manufactured by Kansai Chemicals Co., Ltd.

The content of the polycarbonate component to the total amount of the hot melt composition may be 0 wt %, but it is preferably 3 to 15 wt %, and more preferably 4 to 10 wt %.

<Acrylic Component>

One embodiment of the hot melt composition of the present invention preferably further comprises an acrylic component. Since the solubility parameter of the acrylic component is close to that of the polycarbonate which is a component of the lens of the lighting appliance, the adhesion of the hot melt composition to the polycarbonate is enhanced by the chemical affinity between the acrylic component and the polycarbonate.

Examples of the acrylic component include acrylic resins which are homopolymers or copolymers of one or more compounds selected from ethyl acrylate, butyl acrylate, 2-ethylhexyl acrylate, cyclohexyl methacrylate, isononyl acrylate, methyl methacrylate, n-butyl methacrylate, methyl acrylate, acrylic acid, acrylamide, acrylonitrile, glycidyl methacrylate and the like. The acrylic copolymer may further comprise a monomer unit based on styrene, vinyl acetate or the like. The acrylic component may have a low glass transition point or a high glass transition point.

In one embodiment of the present invention, an acrylic resin in bead form having sharp molecular weight distribution are preferred because the hot melt composition containing this has excellent adhesion to the polycarbonate resin and has excellent form maintaining property at a high temperature due to the acrylic resin having a high glass transition temperature.

Examples of commercially available products of the acrylic component include Dianal series manufactured by Mitsubishi Rayon Corporation.

The content of the acrylic component to the total amount of the hot melt composition may be 0 wt %, preferably 3 to 20 wt % and more preferably 4 to 15 wt %.

The hot melt composition of the present invention may comprise additives commonly used in hot melt compositions, and they are not particularly limited as long as the hot melt composition targeted by the present invention can be obtained. As such an additive, for example, an antioxidant, a plasticizer, an ultraviolet absorber, a pigment, a rheology control agent, wax and the like may be added.

Examples of the "antioxidant" include phenol-based antioxidants, phosphite-based antioxidants, thioether-based antioxidants and amine-based antioxidant.

Examples of the "plasticizer" include a phthalate ester-based plasticizer, an alkylsulfonic acid-based plasticizer, an adipate ester-based plasticizer, an acetate-based plasticizer, a phosphate ester-based plasticizer and the like.

Examples of the "ultraviolet absorber" include benzotriazole, hindered amine, benzoate, benzotriazole and the like.

Examples of the "pigment" include carbon black, titanium oxide and the like.

Examples of the "rheology control agent" include fatty acid amide, fumed silica and the like. Examples of commercial products of the fatty acid amide include A-S-A T-1700, A-S-A T-1800 and the like manufactured by Itoh Oil Chemicals Co., Ltd.

Examples of the "wax" include waxes such as paraffin wax and microcrystalline wax.

The hot melt composition of the present invention is produced by blending the above-mentioned components in a predetermined ratio, blending various additives as necessary, and mixing with heating and melting. Specifically, the above components were charged into a melt-mixing pot equipped with a stirrer and were mixed with heating to prepare the product.

The method of using the hot melt composition of the present invention is not particularly limited. For example, the hot melt composition of the present invention is melted by heating to 180 to 215° C. and is applied to an adherend (for example, a first member and/or a second member). The material of the second member may be the same as or different from that of the first member. A method may be exemplified in which the first member and the second member are joined to form a joined body when the hot melt composition is in a molten state, and then it is allowed to solidify under room temperature (about 20° C. to 25° C.) condition. When the hot melt composition of the present invention is applied to an adherend, various applicators may be used.

Examples of the adherend to which the composition of the present invention may be applied include plastics (for example, polyolefin such as polypropylene; polycarbonate; acrylic resin; PET resin), wood, rubber, glass and metal. It is exemplified as a preferred embodiment to use for adhesion of polycarbonate resins or acrylic resins; or adhesion between polycarbonate resin or acrylic resin and polypropylene.

The hot melt composition of the present invention is also suitable for joining two plastics of different polarity such as joining PP (polypropylene) and PC (polycarbonate).

The hot melt composition according to the present invention may be used as industrial sealing agents such as for sealing electronic and electric components, automobile components, vehicle components and the like, and it is preferably used for a lighting appliance.

One embodiment of the present invention relates to a lighting appliance produced by using the above hot melt composition. Examples of the lighting appliance include lighting appliance for automotive lamps (for example, headlamps, rear combination lamps and the like) and lighting appliance for two-wheeled vehicles (motorbikes and the like).

In the case of being used for an automotive lighting appliance, the composition of the present invention may be used for sealing (bonding) the lens and the housing of the automotive lighting appliance. When the hot melt composition of the present invention is used in an automotive lighting appliance, the materials of the lens and the housing are not particularly limited. Examples of the material of the lens include a transparent resin such as polycarbonate, acrylic resin (PMMA: polymethyl methacrylate resin) and PET, glass, or the like. Examples of the material of the housing include polyolefin such as polypropylene. Since the lighting appliance of the present invention is manufactured by using the above hot melt composition, for example, the inspection time after the lens and the housing of the automotive lighting appliance are adhered is shortened and the lens is not fogged.

Further, the hot melt composition of the present invention may be used for joining waterproof packing parts of household appliances such as washing machines, dryers and refrigerators.

The present invention also relates to a vehicle having a lighting appliance manufactured by using the above hot melt composition. Since the vehicle of the present invention has a lighting appliance manufactured by using the hot melt composition, the lighting appliance is not peeled off by heat or impact and the lens is not fogged, thereby allowing for safer travelling. The vehicle according to the present invention is not particularly limited as long as it has the above lighting appliance. Specific examples of the vehicle include vehicles according to the Road Traffic Law such as railroad vehicles such as an electric railcar, a railroad car and a train, military vehicles such as a tank and an armored car, motor vehicles, motor bicycles (motorcycles), buses, and streetcars.

EXAMPLES

Hereinafter, the present invention will be described with reference to Examples and Comparative Examples, but these examples are for describing the present invention and do not limit the present invention at all.

The components used in the hot melt compositions of Examples and Comparative Examples are described below.
(A) Thermoplastic Block Copolymer
  (A1-1) SEEPS (manufactured by Kuraray Co., Ltd., trade name: SEPTON 4055, styrene content: 30 wt %)
  (A1-2) SEEPS (manufactured by Kuraray Co., Ltd., trade name: SEPTON 4077, styrene content: 30 wt %)
  (A1-3) SEEPS (manufactured by Kuraray Co., Ltd., trade name: SEPTON 4099, styrene content: 30 wt %)
  (A2) SEP (manufactured by Kraton corporation, trade name KRATON G1702HU, styrene content: 28 wt %, diblock content: 100 wt %)
  (A3) SEPS (manufactured by Kuraray Co., Ltd, trade name: SEPTON 2005, styrene content: 20 wt %)
(B) Hydrocarbon-Based Liquid Softening Agent
  (B1-1) paraffinic process oil (manufactured by Idemitsu Kosan Co., Ltd., trade name: Diana Process Oil PW380, aniline point: 142.7° C.)
  (B1-2) paraffinic process oil (manufactured by Idemitsu Kosan Co., Ltd., trade name: Diana Process Oil PS430, aniline point: 138° C.)

(B2-1) paraffinic process oil (manufactured by Idemitsu Kosan Co., Ltd., trade name: Diana Process Oil PW90, aniline point: 124.8° C.)

(B2-2) paraffinic process oil (manufactured by KANEDA Co., Ltd., trade name: Haikoru K350, aniline point: 122.4° C.)

(B2-3) paraffinic process oil (manufactured by Exxon Mobil, trade name: Primol N382, aniline point: 121.9° C.)

(C) Tackifier Resin
  (C1) hydrogenated C5 resin (manufactured by Eastman Chemical Company, product name: Easttack resin H142R, weight-average molecular weight: 1030, softening point: 142° C.)
  (C2) hydrogenated DCPD resin (manufactured by Exxon Mobil, trade name: Escorez 5320, a softening point: 125° C.)
  (C3) pure C9 monomer resin (manufactured by Eastman Chemical Company, trade name: Endex 155, softening point: 152° C.)
  (C4) aromatic hydrocarbon resin (manufactured by Mitsui Chemicals, trade name: FMR150, softening point: 150° C.)
  (C5) terpene phenol resin (manufactured by Arizona Chemical, trade name: SILVERES TP2019, softening point: 125° C., hydroxyl value: 80)

(D) Antioxidant
  (D1) hindered phenol antioxidant (manufactured by BASF, trade name: Irganox 1010)

(E) Carbonate Component
  (E1) polycarbonate diol (manufactured by Asahi Kasei Chemicals Corporation, trade name: DURANOL T5652, a hydroxyl value: 56, number-average molecular weight: 2000)
  (E2) recycled polycarbonate resin (manufactured by Kansai Chemicals Co., Ltd, trade name: recycling PC)

(F) Acrylic Component
  (F1) acrylic resin (manufactured by Mitsubishi Rayon Co., Ltd, trade name: DIANAL BR87, weight-average molecular weight: 25,000, glass transition temperature: 105° C.)

These components were blended in the blending ratios shown in Tables 4 to 6, and melt-kneaded for 4 hours under reduced pressure by a heating kneader (TKV 0.5-1 type) manufactured by Toshin Co., Ltd. set at 200° C., to obtain hot melt compositions of Examples 1 to 17 and Comparative Examples 1 to 10. All numerical units relating to the composition (blending) of the hot melt compositions described in Tables 4 to 6 are parts by weight.

For each hot melt composition, form maintaining property, melt viscosity, shear test, PC adhesion, initial disassembly property and disassembly property after heat-resistant cycle test, and the fogging resistance were evaluated. The outline of each evaluation will be described below. Evaluation results of each hot melt composition are shown in Tables 4 to 6.

<Form Maintaining Property>

In order to evaluate the form maintaining property of each hot melt composition, a hot melt composition was poured into a polypropylene groove having a depth of 12 mm, a width of 7 mm and a length of 14 mm and left to stand in a dryer at 130° C. for 24 hours at an angle of 70°, and the moving distance of the lower tip of the hot melt composition (i.e. the distance flowed out from the state immediately after being applied) was measured. The evaluation criteria based on the moving distance are shown below.

TABLE 1

Evaluation Criteria for form maintaining property at 130° C.

| Evaluation | moving distance |
|---|---|
| ∞ | 0.0 mm |
| ○ | more than 0.0 mm and less than 5.0 mm |
| x | 5.0 mm or more |

<Melt Viscosity>

For the melt viscosity, hot melt compositions were heated and melted, and viscosities in a molten state were measured at 210° C., 200° C., 190° C. and 180° C. respectively at a rotation speed of 1 rpm using a rotational viscometer manufactured by Brookfield Corporation. The spindle was attached to the viscometer, the spindle was rotated, and the lowest value after 30 minutes from the start of heating was measured. Rotor No. 27 was used as the spindle.

<Initial Evaluation (PC Adhesion and Disassembly Property by Shear Test)>

In order to evaluate adhesion and disassembly property to PC (polycarbonate) of each hot melt composition, two PC plates each having a width of 25 mm, a length of 100 mm, and a thickness of 3 mm were used, and the hot melt composition melted at 190° C. was applied to the plate, to prepare a shear test piece having an adhesive layer having a width of 25 mm and a length of 5 mm. The gap between two polycarbonate plates was about 2 mm.

The shear test piece was set on a tensile tester (Tensilon® 250 type) and subjected to a tensile test at a tension speed of 50 mm/min at a temperature of 23° C. (room temperature), and the maximum load was measured. The maximum load (N) was defined as shear adhesion strength. When the maximum load was 2.0 N or more and 6.0 N or less, it was judged that both PC adhesion and disassembly were obtained, and when it was smaller than 2.0 N, it was judged that adhesion was insufficient.

The initial disassembly property was determined by failure mode in a shear test. When the failure mode of the hot melt composition on the polycarbonate plate was an interface failure (also referred to as adhesion failure/"AF"), no material remained on the adhesion surface and it was judged that disassembly was OK. When failure mode of the adhesive on the polycarbonate plate was cohesive failure even partially (also referred to as cohesive failure/"CF"), it was judged that there was a problem with disassembly because the adhesive remains on the polycarbonate at the time of being disassembled. The evaluation criteria are shown in Table 2.

TABLE 2

Evaluation Criteria for shear test of PC/PC

| Evaluation | Shear adhesion strength and Failure mode | Characteristic |
|---|---|---|
| ∞ | 2.0 to 6.0 [N] and AF | Adhesion is sufficient and it is easy to disassemble. |
| ○ | 6.0 [N] or more and 10.0 [N] or less, and AF | Adhesion is sufficient and it is possible to disassemble. |
| x | less than 2.0 [N] | Adhesion is insufficient. |
|  | more than 10.0 [N] | Strength is excessively large and it is difficult to disassemble. |
|  | cohesive failure (CF) | There is a problem with disassembly. |

<Evaluation after Heat-Resistant Cycle Test (PC Adhesion and Disassembly Property by Shear Test)>

In the same way, in order to evaluate the adhesion to PC (polycarbonate) and disassembly of each hot melt composition, two PC plates each having a width of 25 mm, a length of 100 mm, and a thickness of 3 mm were used, and the hot melt composition melted at 190° C. was applied, to prepare a shear test piece having an adhesive layer having a width of 25 mm and a length of 5 mm. The gap between two polycarbonate plates was about 2 mm. The shear test piece was set in a small environmental test machine (SH-241 model manufactured by ESPEC Corporation), and 1 cycle was defined that after 1 hour at 20° C., the temperature was raised for 1 hour, subsequently kept at 85° C. for 1 h, and then the temperature was lowered for 1 hour. After 1,000 cycles, the shear test piece was taken out from the heat-resistant cycle oven. The shear test piece was set on a tensile tester (Tensilon® 250 type) and subjected to a tensile test at a tension speed of 50 mm/min to measure the maximum load. The maximum load (N) was defined as shear adhesion.

In the same way as the initial evaluation, when the maximum load was 2.0 N or more and 6.0 N or less and the failure mode was AF, it was judged that both PC adhesion and disassembly were obtained, and when it was smaller than 2.0 N, it was judged that adhesion was insufficient. The evaluation criteria were the same as in Table 2.

As an index of the strength stability after the heat-resistant cycle test, the strength change ratio was calculated from the initial shear adhesion strength and the shear adhesion strength after the heat-resistant cycle test by the following formula.

Strength change ratio (%)=100×(Shear adhesion after heat-resistant cycle test−Initial shear adhesion strength)/Initial shear adhesion strength Disassembly property after heat-resistant cycle test was determined by failure mode in a shear test in the same way as the initial evaluation. When the failure mode of the hot melt composition on the polycarbonate plate was an interface failure (adhesion failure/AF), no material remained on the adhesion surface and it was judged that disassembly was OK. When the failure mode was AF and the strength change ratio was 20% or less, it was judged that it can be disassembled after a heat-resistant cycle test or after a long-term test expected in actual vehicle use. When a failure mode of the adhesive on the polycarbonate plate was cohesive failure even partially (cohesive failure/CF), it was judged that there was a problem with disassembly because the adhesive remains on the polycarbonate plate at the time of being disassembled. The evaluation criteria are shown in Table 3.

TABLE 3

Evaluation Criteria of disassembly after heat-resistant cycle test

| Evaluation | Strength change ratio and failure mode | Characteristic |
|---|---|---|
| ⊚ | Strength change ratio is less than 10% and AF | It is easy to disassemble. |
| ○ | Strength change ratio is 10 to 20% and AF | It is possible to disassemble. |
| x | Strength change ratio is more than 20% or CF | There is difficulty with disassembly. |

<Fogging Resistance Test>

The hot melt composition melted at 190° C. was placed in a cartridge and applied to a release paper in a 2 mm bead shape using a hot melt gun (Heat Gun TR80 model manufactured by REKA Klebetechnik GmbH & Co. KG). The above adhesive was cut and 1 g of it was put into a 110 ml glass bottle (screw bottle No. 8 manufactured by AS ONE Co., Ltd. having a height of 120 mm, a diameter of 21 mm, a center part outside diameter of 40 mm), covered with a polycarbonate plate and a weight was placed thereon.

The glass bottle containing the adhesive, the polycarbonate plate and the weight were placed in an oil bath (Heating Bath B-491 manufactured by BUCHI Co., Ltd.). The silicone oil in the oil bath was heated, it was confirmed that the temperature reached 90° C., and heating was carried out for 24 hours. After heating for 24 hours, the glass bottle, the polycarbonate plate and the weight were taken out from the oil bath and left to stand until room temperature was reached. Thereafter, the weight was removed, and the deposit on the polycarbonate plate was observed.

(Evaluation Criteria for Fogging Resistance Test)

Evaluation criteria for fogging resistance test are as follows.

○: No deposit was observed on the polycarbonate plate.
x: A deposit was observed on the polycarbonate plate.

TABLE 4

| Composition | Ex. 1 | Ex. 2 | Ex. 3 | Ex. 4 | Ex. 5 | Ex. 6 | Ex. 7 |
|---|---|---|---|---|---|---|---|
| (A1-1) | 30 | 30 | 30 | 30 | 30 | 30 | 30 |
| (A1-2) | 70 | 70 | 70 | 70 | 70 | 70 | 70 |
| (A2) | | | 60 | 60 | 60 | 60 | 40 |
| (A3) | | | | | | | |
| (B1-1) | 1300 | 1300 | 1300 | 1300 | 500 | 900 | 900 |
| (B2-1) | | | | | 400 | 400 | 400 |
| (C1) | 360 | 360 | 360 | 360 | 360 | 360 | 360 |
| (C2) | 340 | 340 | 340 | 340 | 340 | 340 | 340 |
| (C3) | | 20 | | 20 | 20 | 20 | 20 |
| (D1) | 10 | 10 | 10 | 10 | 10 | 10 | 10 |
| (E1) | | | | | | | |
| (E2) | | | | | | | |
| (F1) | | | | | | | |
| Total | 2110 | 2130 | 2170 | 2190 | 1790 | 2190 | 2170 |

TABLE 4-continued

| Composition | | Ex. 1 | Ex. 2 | Ex. 3 | Ex. 4 | Ex. 5 | Ex. 6 | Ex. 7 |
|---|---|---|---|---|---|---|---|---|
| | Form maintaining property at 130° C. | ○○ | ○○ | ○○ | ○○ | ○○ | ○○ | ○○ |
| | Melt Viscosity [mPa·s] (210° C.) | 82000 | 59500 | 246000 | 200000 | 53250 | 37750 | 23500 |
| | Melt Viscosity [mPa·s] (200° C.) | 215250 | 159750 | 250000 or more | 250000 or more | 159750 | 117000 | 82500 |
| | Melt Viscosity [mPa·s] (190° C.) | 250000 or more | 250000 or more | 250000 or more | 250000 or more | 250000 or more | 250000 or more | 226250 |
| | Melt Viscosity [mPa·s] (180° C.) | 250000 or more | 250000 or more | 250000 or more | 250000 or more | 250000 or more | 250000 or more | 250000 or more |
| Initial Evaluation | Evaluation of shear test for PC/PC | ○○ | ○ | ○○ | ○ | ○ | ○○ | ○○ |
| | Shear adhesion strength for PC/PC (room temperature)[N] | 4.9 | 8.0 | 6.0 | 6.4 | 6.6 | 4.4 | 2.9 |
| | Disassembly property (failure mode of shear test) | AF | AF | AF | AF | AF | AF | AF |
| Evaluation after heat-resistant cycle test | Evaluation of shear test for PC/PC | ○○ | ○ | ○○ | ○ | ○ | ○○ | ○○ |
| | Shear adhesion strength for PC/PC (room temperature)[N] | 5.0 | 7.9 | 5.9 | 6.4 | 6.8 | 4.5 | 3.1 |
| | Evaluation of disassembly property after heat-resistant cycle test | ○○ | ○○ | ○○ | ○○ | ○○ | ○○ | ○○ |
| | Strength change ratio after heat-resistant cycle test (%) | 2.7 | −1.3 | −1.7 | 0.0 | 3.0 | 2.3 | 6.9 |
| | disassembly property (failure mode of shear test) | AF | AF | AF | AF | AF | AF | AF |
| | Fogging resistance test | ○ | ○ | ○ | ○ | ○ | ○ | ○ |

Ex. = Example

TABLE 5

| Composition | | Ex. 8 | Ex. 9 | Ex. 10 | Ex. 11 | Ex. 12 | Ex. 13 |
|---|---|---|---|---|---|---|---|
| | (A1-1) | 30 | 30 | 30 | 30 | 30 | 30 |
| | (A1-2) | 70 | 70 | 70 | 70 | 70 | 70 |
| | (A2) | 80 | 40 | 40 | 60 | 60 | 20 |
| | (A3) | | | | | | |
| | (B1-1) | 900 | 700 | 900 | 900 | 800 | 900 |
| | (B1-2) | | | | | | |
| | (B2-1) | 400 | 600 | 600 | 400 | 400 | 400 |
| | (C1) | 360 | 360 | 360 | 360 | 360 | 360 |
| | (C2) | 340 | 340 | 340 | 360 | 340 | 340 |
| | (C3) | 20 | 20 | 20 | | 20 | 20 |
| | (D1) | 10 | 10 | 10 | 10 | 10 | 10 |
| | (E1) | | | | | 100 | |
| | (E2) | | | | | | 100 |
| | (F1) | | | | | | |
| | Total | 2210 | 2170 | 2370 | 2190 | 2190 | 2250 |
| | Form maintaining property at 130° C. | ○○ | ○ | ○○ | ○ | ○○ | ○ |
| | Melt Viscosity [mPa·s] (210° C.) | 53750 | 16500 | 21000 | 46000 | 52500 | 6000 |
| | Melt Viscosity [mPa·s] (200° C.) | 150250 | 55250 | 77000 | 138000 | 152750 | 17750 |
| | Melt Viscosity [mPa·s] (190° C.) | 250000 or more | 165000 | 222250 | 250000 or more | 250000 or more | 43500 |
| | Melt Viscosity [mPa·s] (180° C.) | 250000 or more | 236250 | 250000 or more | 250000 or more | 250000 or more | 102000 |
| Initial Evaluation | Evaluation of shear test for PC/PC | ○○ | ○ | ○○ | ○○ | ○○ | ○○ |
| | Shear adhesion strength for PC/PC (room temperature)[N] | 2.9 | 8.0 | 2.9 | 3.3 | 4.0 | 4.0 |
| | Disassembly property (failure mode of shear test) | AF | AF | AF | AF | AF | AF |
| Evaluation after heat-resistant cycle test | Evaluation of shear test for PC/PC | ○○ | ○ | ○○ | ○○ | ○○ | ○○ |
| | Shear adhesion strength for PC/PC (room temperature)[N] | 3.4 | 7.8 | 2.9 | 3.5 | 4.2 | 4.0 |
| | Evaluation of disassembly property after heat-resistant cycle test | ○ | ○○ | ○○ | ○○ | ○○ | ○○ |
| | Strength change ratio after heat-resistant cycle test (%) | 17.2 | −2.5 | 0.0 | 6.1 | 5.0 | 0.0 |
| | Disassembly property (failure mode of shear test) | AF | AF | AF | AF | AF | AF |
| | Fogging resistance test | ○ | ○ | ○ | ○ | ○ | ○ |

TABLE 5-continued

| Composition | | Ex. 14 | Ex. 15 | Ex. 16 | Ex. 17 |
|---|---|---|---|---|---|
| (A1-1) | | 30 | 50 | 30 | 30 |
| (A1-2) | | 70 | 50 | 70 | 70 |
| (A2) | | 10 | 60 | | 60 |
| (A3) | | | | | |
| (B1-1) | | 800 | 900 | | |
| (B1-2) | | | | 1300 | 1300 |
| (B2-1) | | 400 | 400 | | |
| (C1) | | 360 | 360 | 360 | 360 |
| (C2) | | 340 | 340 | 340 | 340 |
| (C3) | | 20 | 20 | 20 | 20 |
| (D1) | | 10 | 10 | 10 | 10 |
| (E1) | | | | | |
| (E2) | | | | | |
| (F1) | | 100 | | | |
| Total | | 2140 | 2190 | 2130 | 2190 |
| Form maintaining property at 130° C. | | ○ | ○○ | ○○ | ○○ |
| Melt Viscosity [mPa · s] (210° C.) | | 11500 | 24250 | 22750 | 37000 |
| Melt Viscosity [mPa · s] (200° C.) | | 39500 | 84750 | 75250 | 108750 |
| Melt Viscosity [mPa · s] (190° C.) | | 60000 | 232750 | 220250 | 236250 |
| Melt Viscosity [mPa · s] (180° C.) | | 220000 | 250000 or more | 250000 or more | 250000 or more |
| Initial Evaluation | Evaluation of shear test for PC/PC | ○○ | ○○ | ○○ | ○○ |
| | Shear adhesion strength for PC/PC (room temperature)[N] | 4.5 | 4.4 | 2.0 | 4.4 |
| | Disassembly property (failure mode of shear test) | AF | AF | AF | AF |
| Evaluation after heat-resistant cycle test | Evaluation of shear test for PC/PC | ○○ | ○○ | ○○ | ○○ |
| | Shear adhesion strength for PC/PC (room temperature)[N] | 4.5 | 4.3 | 2.1 | 4.5 |
| | Evaluation of disassembly property after heat-resistant cycle test | ○○ | ○○ | ○○ | ○○ |
| | Strength change ratio after heat-resistant cycle test (%) | 0.0 | −2.3 | 5.0 | 2.3 |
| | Disassembly property (failure mode of shear test) | AF | AF | AF | AF |
| | Fogging resistance test | ○ | ○ | ○ | ○ |

Ex. = Example

TABLE 6

| Composition | Comp-Ex. 1 | Comp-Ex. 2 | Comp-Ex. 3 | Comp-Ex. 4 | Comp-Ex. 5 | Comp-Ex. 6 | Comp-Ex. 7 | Comp-Ex. 8 | Comp-Ex. 9 | Comp-Ex. 10 |
|---|---|---|---|---|---|---|---|---|---|---|
| (A1-1) | 60 | 30 | 160 | 30 | 30 | | | | 30 | |
| (A1-2) | 100 | 70 | | 70 | 70 | | | | 70 | 200 |
| (A1-3) | | | | | | | | 200 | | |
| (A2) | | | | 60 | 60 | 160 | | | | |
| (A3) | | 60 | | | | | 160 | | | |
| (B1-1) | | | | | | 900 | 900 | | | |
| (B2-1) | 900 | 900 | 900 | 900 | 900 | 400 | 400 | | | |
| (B2-2) | | | | | | | | 2000 | 1300 | |
| (B2-3) | | | | | | | | | | 2000 |
| (C1) | 360 | 360 | 360 | 360 | 360 | 360 | 360 | | 360 | |
| (C2) | 340 | 340 | 340 | 290 | 340 | 340 | 340 | | 340 | |
| (C3) | 20 | 20 | 20 | 70 | 20 | 20 | 20 | | | |
| (C4) | | | | | | | | 400 | | |
| (C5) | | | | | | | | | | 400 |
| (D1) | 10 | 10 | 10 | 10 | 10 | 10 | 10 | 10 | 10 | 10 |
| Total | 1790 | 1790 | 1790 | 1790 | 1790 | 2190 | 2190 | 2610 | 2110 | 2610 |
| Form maintaining property at 130° C. | x | x | x | x | x | x | x | x | x | x |
| Melt Viscosity [mPa · s] (210° C.) | 1250 | 3000 | 1500 | 200 | 4000 | 2250 | 2000 | 8000 | 250 | 4250 |
| Melt Viscosity [mPa · s] (200° C.) | 3250 | 7500 | 4500 | 200 | 11750 | 4500 | 4400 | 22500 | 500 | 11500 |
| Melt Viscosity [mPa · s] (190° C.) | 9250 | 20500 | 9000 | 250 | 39750 | 39000 | 38000 | 66000 | 1750 | 40500 |
| Melt Viscosity [mPa · s] (180° C.) | 32750 | 64500 | 32750 | 350 | 139000 | 44250 | 42500 | 168750 | 6250 | 128500 |

TABLE 6-continued

| | Composition | Comp-Ex. 1 | Comp-Ex. 2 | Comp-Ex. 3 | Comp-Ex. 4 | Comp-Ex. 5 | Comp-Ex. 6 | Comp-Ex. 7 | Comp-Ex. 8 | Comp-Ex. 9 | Comp-Ex. 10 |
|---|---|---|---|---|---|---|---|---|---|---|---|
| Initial Evaluation | Evaluation of shear test for PC/PC | x | x | ○ | x | ○ | x | x | ○ | x | x |
| | Shear adhesion strength for PC/PC (room temperature)[N] | 1.9 | 1.8 | 4.7 | 1.5 | 4.6 | 1.6 | 1.5 | 8.5 | 0.6 | 0.7 |
| | Disassembly property (failure mode of shear test) | AF | AF | AF | AF | AF | CF | CF | AF | AF | AF |
| Evaluation after heat-resistant cycle test | Evaluation of shear test for PC/PC | x | x | ○ | x | ○ | x | x | ○ | x | x |
| | Shear adhesion strength for PC/PC (room temperature)[N] | 2.9 | 3.0 | 10.2 | 2.0 | 5.7 | 2.0 | 2.1 | 10.3 | 0.7 | 0.8 |
| | Evaluation of disassembly property after heat-resistant cycle test | x | x | x | x | x | x | x | x | ○ | ○ |
| | Strength change ratio after heat-resistant cycle test (%) | 52.6 | 66.7 | 117.0 | 33.3 | 23.9 | 25.0 | 40.0 | 21.2 | 16.7 | 14.3 |
| | Disassembly property (failure mode of shear test) | AF | AF | AF | AF | AF | CF | CF | AF | AF | AF |
| Fogging resistance test | | x | ○ | x | x | ○ | ○ | ○ | ○ | x | ○ |

Comp-Ex. = Comparative Example

As shown in Tables 4 and 5, for the hot melt compositions of the Examples, form maintaining property is very excellent and shear adhesion strength was high, and thus it was possible to obtain high adhesion to carbonate component. Further, for the hot melt compositions of the Examples, failure modes were AF and high disassembly property could be obtained.

In the hot melt compositions of the Examples, strength change ratio was small even after the heat-resistant cycle test and stable disassembly was obtained. Accordingly, if the hot melt composition of the present invention is used for a lighting appliance, stable disassembly can be obtained after long-term use. Furthermore, the hot-melt compositions of the Examples had high fogging resistance and no fogging of the lens due to heating occurred.

INDUSTRIAL APPLICABILITY

The present invention provides a hot melt composition used for bonding a lens and a housing for automotive lighting appliance. For the hot melt composition according to the present invention, a sealing part can be easily disassembled for replacement or maintenance of electrical components in a lighting appliance represented by a light emitting diode. In particular, the hot melt composition according to the present invention can satisfy high adhesion to a polycarbonate resin which is required for sealing applications, high disassemble property required for repair and maintenance, and removing requirement from polycarbonate which is demand on workability at disassembling after even long-term use.

The invention claimed is:

1. A method of forming a removable article, the method comprising:
   applying a hot melt adhesive to a first substrate at a temperature between 180° C. and 210° C., inclusive, wherein the hot melt adhesive has a shear adhesion value of between 2 N and 6 N, inclusive, the hot melt adhesive comprising:
   a thermoplastic block copolymer present in an amount between 4 wt % and 10 wt %, inclusive, based on the total weight of the hot melt adhesive, the thermoplastic block copolymer comprising a styrene-ethylene-ethylene/propylene-styrene (SEEPS) block copolymer,
   a hydrocarbon-based oil having an aniline point of 135° C. or more, the hydrocarbon-based oil being present in an amount between 40 wt % and 80 wt %, inclusive, based on the total weight of the hot melt adhesive, and
   a polycarbonate diol present in an amount between 3 wt % and 15 wt %, inclusive, based on the total weight of the hot melt adhesive; and
   applying a second substrate onto the hot melt adhesive to form the removable article, wherein:
   the shear adhesion value of the hot melt adhesive is a maximum load before adhesive failure as determined by a shear test, the shear test being conducted using two polycarbonate plates bonded together with a layer of the hot melt adhesive having a width of 25 mm and a length of 5 mm, and the shear test comprising subjecting the polycarbonate plates bonded together with the layer of hot melt adhesive to a tensile tester operating at a tension speed of 50 mm/min at a temperature of 23° C. until adhesive failure occurs.

2. The method of claim 1, wherein:
   the first substate is made of at least one of plastic, wood, rubber, glass, or metal, and
   the second substrate is made of at least one of wood, rubber, glass, or metal.

3. The method of claim 2, wherein:
the first substrate is made of at least one of polyolefin, polycarbonate, acrylic resin, or PET resin, and
the second substrate is made of at least one of polyolefin, polycarbonate, acrylic resin, or PET resin.

4. The method of claim 2, wherein:
the first substate is made of at least one of polycarbonate, acrylic resin, or polypropylene, and
the second substrate is made of at least one of polycarbonate, acrylic resin, or polypropylene.

5. The method of claim 2, wherein:
the first substate is made of at least one of polycarbonate or polypropylene, and
the second substrate is made of at least one of polycarbonate or polypropylene.

6. The method of claim 1, wherein:
the thermoplastic block copolymer further comprises a styrene-ethylene/propylene (SEP) block copolymer, and
a ratio content of the SEP block copolymer, based on 100 parts by weight of the SEEPS block copolymer, is between 5 and 100 parts by weight, inclusive.

7. The method of claim 6, wherein:
the hot melt adhesive further comprises a tackifier resin having a softening point of 120° C. or more, and
the tackifier resin is present in an amount between 30 wt % and 50 wt %, inclusive, based on the total weight of the hot melt adhesive.

8. The method of claim 1, further comprising:
removing the first substrate with a shear force exceeding the shear adhesion value.

9. The method of claim 1, wherein the removable article is a household appliance.

10. The method of claim 9, wherein the household appliance is one of a washing machine, a dryer, or a refrigerator.

11. The method of claim 1, wherein the removable article is a lighting appliance.

12. The method of claim 11, wherein the lighting appliance is an automotive lamp.

13. A method of forming a removable article, the method comprising:
applying a hot melt adhesive to a first substrate at a temperature between 180° C. and 210° C., inclusive, wherein the hot melt adhesive has a shear adhesion value of between 2 N and 6 N, inclusive, the hot melt adhesive comprising:
a thermoplastic block copolymer, the thermoplastic block copolymer present in an amount between 4 wt % and 10 wt %, inclusive, based on the total weight of the hot melt adhesive, the thermoplastic block copolymer comprising:
a styrene-ethylene-ethylene/propylene-styrene (SEEPS) block copolymer, and
a styrene-ethylene/propylene (SEP) block copolymer, a ratio content of the SEP block copolymer, based on 100 parts by weight of the SEEPS block copolymer, being between 5 and 100 parts by weight, inclusive,
a hydrocarbon-based oil having an aniline point of 135° C. or more, the hydrocarbon-based oil present in an amount of between 40 wt % and 80 wt %, inclusive, based on the total weight of the hot melt adhesive,
a tackifier resin having a softening point of 120° C. or more, the tackifier resin present in an amount between 30 wt % and 50 wt %, inclusive, based on the total weight of the hot melt adhesive, and
a polycarbonate diol present in an amount between 3 wt % and 15 wt %, inclusive, based on the total weight of the hot melt adhesive; and
applying a second substrate onto the hot melt adhesive; and
removing the first substrate with a shear force resistance exceeding the shear adhesion value, wherein:
the shear adhesion value of the hot melt adhesive is a maximum load before adhesive failure as determined by a shear test, the shear test being conducted using two polycarbonate plates bonded together with a layer of the hot melt adhesive having a width of 25 mm and a length of 5 mm, and the shear test comprising subjecting the polycarbonate plates bonded together with the layer of hot melt adhesive to a tensile tester operating at a tension speed of 50 mm/min at a temperature of 23° C. until adhesive failure occurs.

14. The method of claim 13, wherein the removable article is a household appliance or a lighting appliance.

15. The method of claim 1, wherein the hot melt adhesive further comprises a tackifier resin having a softening point of 120° C. or more, the tackifier resin being present in an amount between 30 wt % and 50 wt %, inclusive, based on the total weight of the hot melt adhesive.

16. The method of claim 13, wherein:
the removable article is a lighting appliance and the first substrate is a lens, and
the hot melt adhesive has an higher chemical affinity with the lens than with the second substrate such that removing the first substrate comprises removing the hot melt adhesive together with the lens.

* * * * *